US012795786B2

(12) United States Patent
Tsukahara

(10) Patent No.: US 12,795,786 B2
(45) Date of Patent: Nov. 10, 2026

(54) MICROWAVE PROCESSING APPARATUS AND MICROWAVE PROCESSING METHOD

(71) Applicant: MICROWAVE CHEMICAL CO., LTD., Osaka (JP)

(72) Inventor: Yasunori Tsukahara, Osaka (JP)

(73) Assignee: Microwave Chemical Co., Ltd., Osaka (JP)

( * ) Notice: Subject to any disclaimer, the term of this patent is extended or adjusted under 35 U.S.C. 154(b) by 1011 days.

(21) Appl. No.: 17/797,859

(22) PCT Filed: Feb. 5, 2021

(86) PCT No.: PCT/JP2021/004307
§ 371 (c)(1),
(2) Date: Jan. 18, 2023

(87) PCT Pub. No.: WO2021/157693
PCT Pub. Date: Aug. 12, 2021

(65) Prior Publication Data

US 2023/0156876 A1 May 18, 2023

(30) Foreign Application Priority Data

Feb. 7, 2020 (JP) ................................ 2020-020084

(51) Int. Cl.
*H05B 6/64* (2006.01)
*H05B 6/70* (2006.01)
*H05B 6/74* (2006.01)

(52) U.S. Cl.
CPC ........... *H05B 6/6402* (2013.01); *H05B 6/708* (2013.01); *H05B 6/74* (2013.01)

(58) Field of Classification Search
CPC ............ H05B 2206/046; H05B 6/6402; H05B 6/708; H05B 6/74; H05B 6/80
(Continued)

(56) References Cited

U.S. PATENT DOCUMENTS 6,998,593 B2 * 2/2006 Lee ...................... H05B 6/6408 219/733
8,847,131 B2 * 9/2014 Fang .................... H05B 6/6402 219/726
(Continued)

FOREIGN PATENT DOCUMENTS

CN 107820522 B 4/2019
JP 51-057331 U 5/1976
(Continued)

OTHER PUBLICATIONS

Notice of Reasons for Refusal dated Apr. 16, 2024, from corresponding Japanese application No. 2021-073124.
(Continued)

*Primary Examiner* — Quang T Van
(74) *Attorney, Agent, or Firm* — Troutman Pepper Locke LLP

(57) ABSTRACT

A microwave processing apparatus includes a cavity that has a cylinder-like shape, is rotatably supported, and includes an internal space for accommodating a microwave irradiation object, the cavity including at least one microwave transmission area in a partial region of the cavity in an axial direction; a rotary drive unit configured to rotate the cavity about the axis thereof; a cover member that is provided on an outer circumferential side of the at least one microwave transmission area while covering the entire portion of the cavity in a circumferential direction, the cover member forming a wave guidepath for microwaves and being fixed to a side of the base; and a microwave generator. Microwaves from the microwave generator are introduced into the internal space from a circumferential surface of the cavity via the wave guidepath.

4 Claims, 10 Drawing Sheets

(58) Field of Classification Search
USPC ....... 219/690, 693, 679, 680, 697, 701, 710, 219/712, 725, 730, 749, 751, 752, 754, 219/759, 762, 763
See application file for complete search history.

(56) References Cited

U.S. PATENT DOCUMENTS

| | | | |
|---|---|---|---|
| 10,349,471 | B2 | 7/2019 | Oishibashi |
| 2003/0107145 | A1 | 6/2003 | Ozasa et al. |
| 2003/0205574 | A1 | 11/2003 | Risman et al. |
| 2010/0025394 | A1 | 2/2010 | Jussel et al. |
| 2016/0105931 | A1 | 4/2016 | Boulard |
| 2018/0352616 | A1 | 12/2018 | Oishibashi |
| 2019/0240962 | A1 | 8/2019 | Houck et al. |

FOREIGN PATENT DOCUMENTS

| | | | |
|---|---|---|---|
| JP | S5157331 | U | 5/1976 |
| JP | S6375325 | U | 5/1988 |
| JP | H06111933 | A | 4/1994 |
| JP | H08124671 | A | 5/1996 |
| JP | 2005029255 | A | 2/2005 |
| JP | 2005216599 | A | 8/2005 |
| JP | 4413271 | B1 | 2/2010 |
| JP | 2012-220183 | A | 11/2012 |
| JP | 2017-195096 | A | 11/2012 |
| JP | 2018-106893 | A | 7/2018 |
| WO | 2002022353 | A1 | 3/2002 |

OTHER PUBLICATIONS

Internatioal Search Report dated Apr. 6, 2021, from corresponding application No. PCT/JP2021/004307.
Notice of Reasons for Refusal dated Dec. 22, 2020, from corresponding Japanese application No. 2020-020084.
Extended European Search Report and Search Opinion dated Feb. 6, 2024, from corresponding European Application No. 21750937.1.
First Office Action issued in corresponding Chinese Patent Application No. 202180026039.9, dated Oct. 1, 2025 (Including English machine translation).
Preliminary Office Action issued in corresponding Brazilian Patent Application No. BR112022015179-9, dated Feb. 11, 2026 (Including English machine translation).
Examination Report No. 2 issued in corresponding Australian Patent Application No. 2021215627, dated Feb. 24, 2026.
First Office Action issued in corresponding Chinese Patent Application No. 202180026910.5, dated Oct. 1, 2025 (Including English machine translation).
Examination Report No. 1 issued in corresponding Australian Patent Application No. 2021215627, dated Oct. 31, 2025.
Second Notice of Examination issued in corresponding Chinese Patent Application No. 202180026039.9, dated May 1, 2026 (including English machine translation).
Final Rejection issued in corresponding Chinese Patent Application No. 202180026039.9, dated Jul. 1, 2026 (including English machine translation).

* cited by examiner

MICROWAVE PROCESSING APPARATUS AND MICROWAVE PROCESSING METHOD

CROSS REFERENCE TO RELATED APPLICATIONS

This is a U.S. National Phase Application under 35 U.S.C. § 371 of International Patent Application No. PCT/JP2021/004307, filed Feb. 5, 2021, which claims priority of Japanese Patent Application No. 2020-020084, filed Feb. 7, 2020. The entire contents of which are hereby incorporated by reference.

FIELD OF THE INVENTION

The present invention relates to a microwave processing apparatus, a microwave introduction apparatus, and a microwave processing method that irradiates an object located in a cavity in a cylinder-like shape with microwaves.

BACKGROUND

Conventionally, processing apparatuses are known that irradiate, while rotating a cylindrical cavity, an object (object to be heated) located in the cavity with microwaves and heat the object, thereby drying of the object or subjecting the object to a reaction (see JP 2017-195096A).

However, in conventional processing apparatuses, microwaves are introduced into a cylindrical cavity from an end portion of the cavity, and thus there is a problem that if the length of the cavity in an axial direction is large, an object located in the cavity may not be able to be appropriately heated. Generally speaking, there is a demand for irradiating, with microwaves, an object located in a rotatable cavity having a cylinder-like shape more appropriately.

The present invention was made in view of the above-described circumstances, and it is an object thereof to provide a microwave processing apparatus, a microwave introduction apparatus, and a microwave processing method that can irradiate, with microwaves, an object located in a rotatable cavity having a cylinder-like shape more appropriately.

SUMMARY

To achieve the above-described object, according to an aspect of the present invention, a microwave processing apparatus includes: a cavity that has a cylinder-like shape, is rotatably supported on a fixed base, and includes an internal space for accommodating a microwave irradiation object; a rotary drive unit configured to rotate the cavity about an axis of the cylinder-like shape; and a microwave generator configured to generate microwaves, wherein the microwaves generated by the microwave generator are introduced into the internal space from a circumferential surface of the cavity.

Also, in the microwave processing apparatus according to the aspect of the present invention, the cavity may include at least one microwave transmission area in a partial region of the cavity in an axial direction.

Also, in the microwave processing apparatus according to the aspect of the present invention, a microwave transmitting window may constitute each of the at least one microwave transmission area.

Also, in the microwave processing apparatus according to the aspect of the present invention, the cavity may be lined with a microwave transmitting member, and part of the microwave transmitting member may constitute the at least one microwave transmission area.

Also, the microwave processing apparatus according to the aspect of the present invention may further include a cover member that is provided on an outer circumferential side of the at least one microwave transmission area while covering the entire portion of the cavity in a circumferential direction, the cover member forming a wave guidepath for the microwaves introduced from the microwave generator on an outer circumferential side of the cavity.

Also, in the microwave processing apparatus according to the aspect of the present invention, the cover member may be fixed to a side of the base so as to be movable relative to the cavity.

Also, in the microwave processing apparatus according to the aspect of the present invention, the at least one microwave transmission area may be provided over the entirety of the cavity in the circumferential direction.

Also, in the microwave processing apparatus according to the aspect of the present invention, the at least one microwave transmission area may be slit-shaped.

Also, according to an aspect of the present invention, a microwave introduction apparatus includes: a cover member that is provided on an outer circumferential side of at least one microwave transmission area formed in a partial region of a cavity in an axial direction, while covering the entire portion of the cavity in a circumferential direction, the cavity having a cylinder-like shape, being rotatably supported on a fixed base, and including an internal space for accommodating a microwave irradiation object, the cover member forming a wave guidepath for microwaves on an outer circumferential side of the cavity; and a microwave generator configured to generate microwaves to be introduced into the wave guidepath.

Also, according to an aspect of the present invention, a microwave processing method includes the steps of: rotating a cavity that has a cylinder-like shape, is rotatably supported on a fixed base, and includes an internal space for accommodating a microwave irradiation object, about an axis of the cylinder-like shape; and introducing microwaves into the internal space from a circumferential surface of the cavity.

With the microwave processing apparatus, the microwave introduction apparatus, and the microwave processing method according to the aspects of the present invention, a microwave irradiation object can be irradiated with microwaves at a position at which microwave irradiation is desired, even if the length of a cavity having a cylinder-like shape in the axial direction is large, for example.

DETAILED DESCRIPTION

Figure 1:
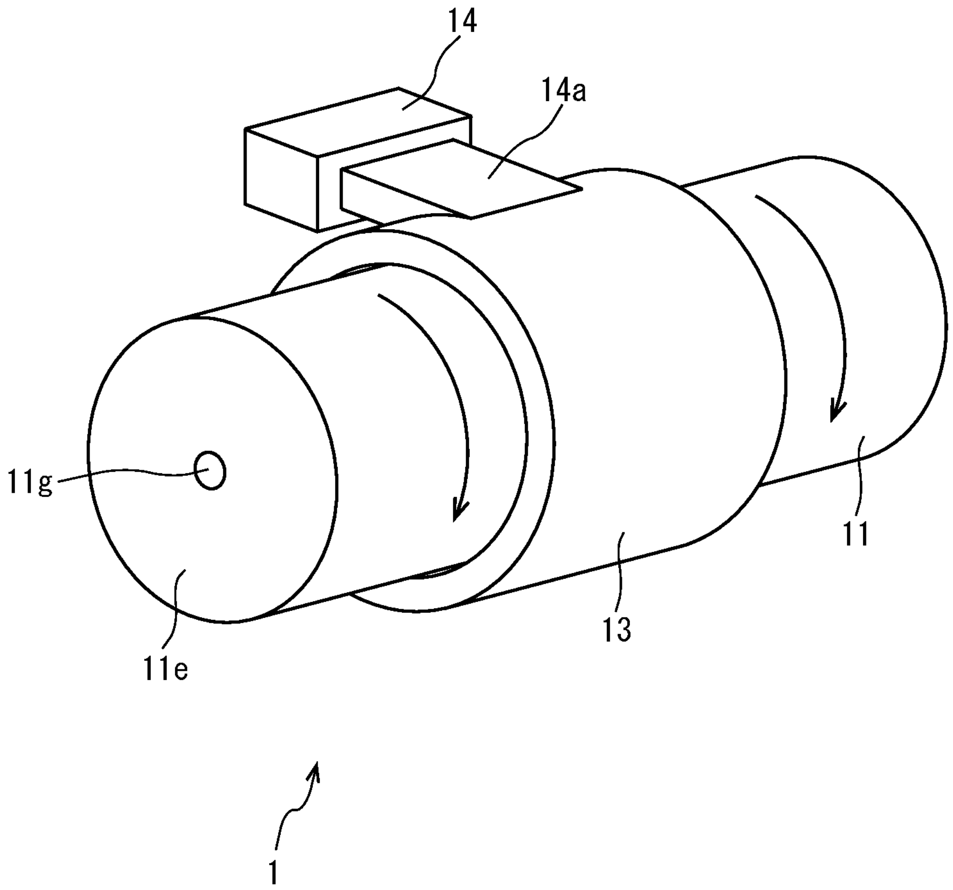
FIG. 1 is a perspective view illustrating a microwave processing apparatus according to an embodiment of the present invention.

Hereinafter, the microwave processing apparatus and the microwave processing method according to the present invention will be described with reference to embodiments. Note that in the following embodiments, constituent components denoted by the same reference numerals are identical or correspond to each other, and thus redundant descriptions may be omitted. The microwave processing apparatus according to the present embodiment is designed to introduce microwaves into an internal space of a rotatable cavity having a cylindrical shape from a circumferential surface thereof.

Figure 2:
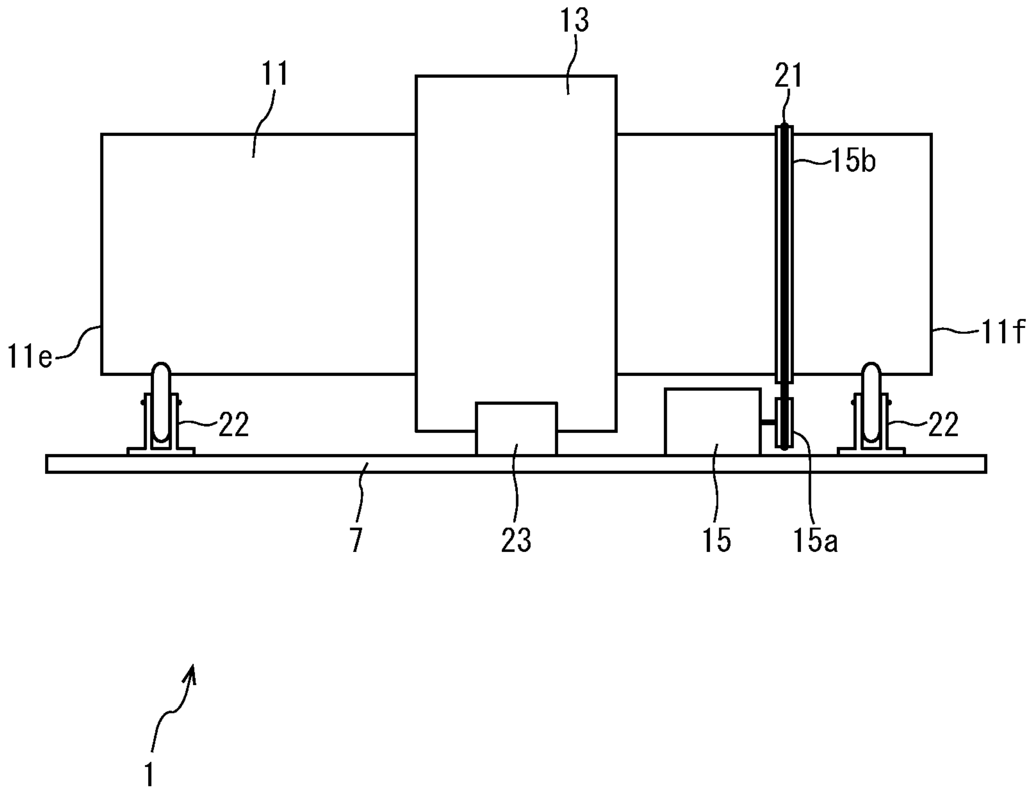
FIG. 2 is a front view illustrating the microwave processing apparatus according to the embodiment.
Figure 3:
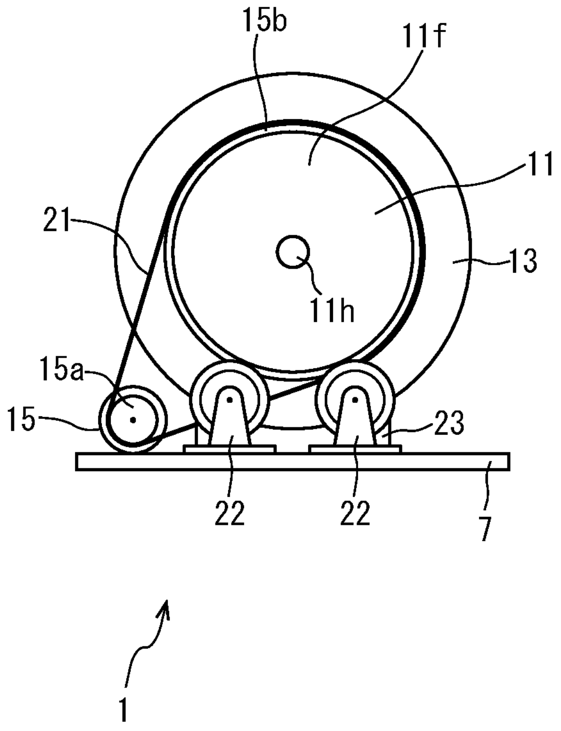
FIG. 3 is a side view illustrating the microwave processing apparatus according to the embodiment.
Figure 4:
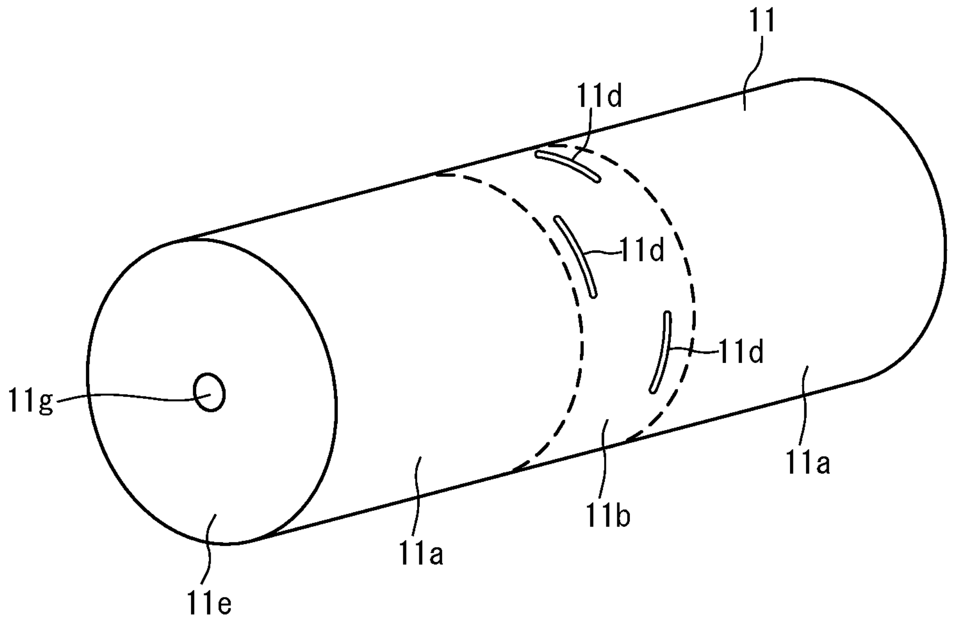
FIG. 4 is a perspective view illustrating a cavity according to the embodiment.
Figure 5A:
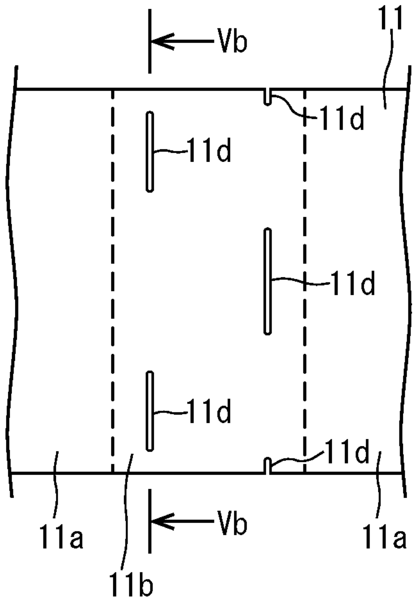
FIG. 5A is a front view illustrating a portion in which a plurality of microwave transmission areas are provided according to the embodiment.
Figure 5B:
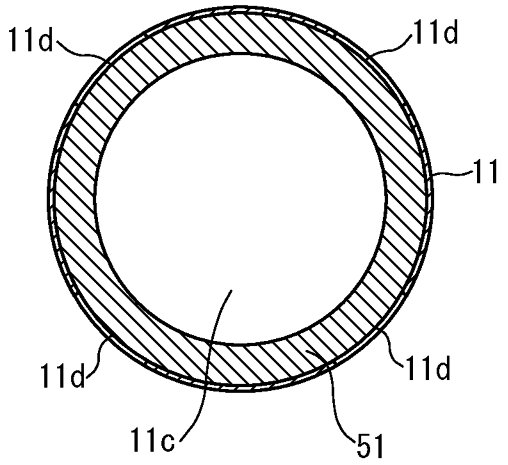
FIG. 5B is a vertical cross-sectional view of the portion in which the plurality of microwave transmission areas are provided according to the embodiment.
Figure 6:
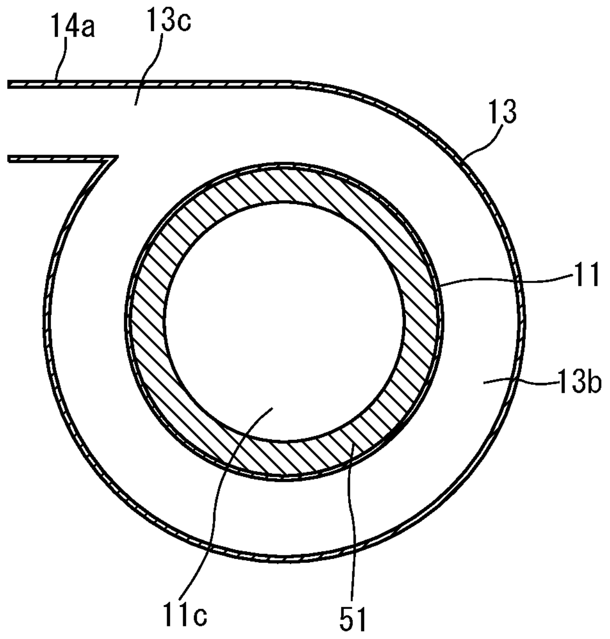
FIG. 6 is a cross-sectional view taken along a plane perpendicular to an axial direction of the microwave processing apparatus according to the embodiment.
Figure 7:
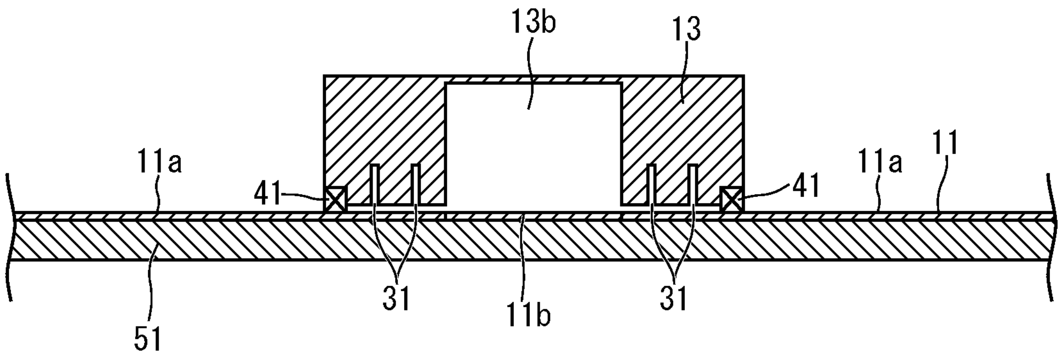
FIG. 7 is a cross-sectional view taken along a plane passing through the central axis of the microwave processing apparatus according to the embodiment.

FIG. 1 is a perspective view showing a main configuration of a microwave processing apparatus 1 according to the present embodiment. FIG. 2 is a front view of the microwave processing apparatus 1, and FIG. 3 is a side view of the microwave processing apparatus 1. FIG. 4 is a perspective view showing an outer appearance of a cavity 11. Note that FIG. 4 shows a state in which a cover member 13 shown in FIG. 1 was removed. FIG. 5A is a front view showing a microwave transmission portion 11*b* of the cavity 11 in which a plurality of microwave transmission areas 11*d* are formed, and FIG. 5B is a cross-sectional view taken along a line Vb-Vb in FIG. 5A. FIG. 6 is a vertical cross-sectional view only showing an end surface of a cross section taken along a plane that is perpendicular to the axial direction of the microwave processing apparatus 1 shown in FIG. 1 and extends through a waveguide 14*a*. Note that in FIG. 6, illustration of a microwave generator 14 is omitted. FIG. 7 is a vertical cross-sectional view taken along a plane parallel to the axial direction of the microwave processing apparatus 1 shown in FIG. 1. Note that FIG. 7 only shows the upper side of the microwave processing apparatus 1.

The microwave processing apparatus 1 according to the present embodiment includes the cavity 11, the cover member 13, the microwave generator 14, and a rotary drive unit 15. Any type of object is to be irradiated with and heated by microwaves. Examples of the object may include a cement material, calcium carbonate, which is a material of burnt lime, mineral, and trash, and may also include a material to be subjected to chemical reaction, a material to be dried, and other materials to be irradiated with microwaves. For example, the object may be granular solid, powder, or the like, or may be liquid. Typically, the object is directly put into the cavity 11, and is irradiated with microwaves while being stirred with the rotation of the cavity 11.

While being irradiated with microwaves, an object located in an internal space 11*c* of the cavity 11 may or may not move. That is to say, processing performed by irradiating the object with microwaves may be continuous processing or batch processing. When continuous processing is performed on the object, the object may continuously move, or may repeat moving and stopping, for example. When continuous processing is performed on the object, for example, the cavity 11 is inclined so that a portion of the cavity 11 on the downstream side is located at a lower position, and the object may be fed from an end portion of the cavity 11 on the upstream side to an end portion on the downstream side, while being stirred with the rotation of the cavity 11. Also, a separate mechanism for stirring or transporting the object may be provided inside the cavity 11.

The irradiation of the object with microwaves may be performed, for example, to dry the object, or may be performed to melt, sublimate, or evaporate the object. The irradiation of the object with microwaves may also be performed to subject the object to a reaction, to calcine the object, to sterilize the object, or for other usages. The reaction of the object may be a chemical reaction, for example. The object may be irradiated with microwaves under, for example, ordinary pressure, reduced pressure, or increased pressure. Also, the irradiation with microwaves may or may not be performed in an air flow or an inert gas flow, for example. Examples of the inert gas include noble gas such as helium or argon, or nitrogen.

The cavity 11 is a cavity that has a cylindrical shape and includes an internal space 11*c* for accommodating a microwave irradiation object. In the internal space 11*c* of the cavity 11, the object is irradiated with microwaves. The mode of microwaves in the space 11*c* is typically a multimode. As shown in FIG. 4, the cavity 11 includes a cavity main body 11*a*, and the microwave transmission portion 11*b* provided in a partial region of the cavity 11 in the axial direction. In FIGS. 4, 5A, and 5B, boundaries between the cavity main body 11*a* and the microwave transmission portion 11*b* are denoted by dotted lines. The cavity main body 11*a* and the microwave transmission portion 11*b* typically have a hollow cylindrical shape, that is, the shape of a pipe. Note that the axial direction refers to a direction of the central axis of the cylindrical shape of the cavity 11. Also, a direction of the circumference of the cylindrical shape may be referred to as a circumferential direction. Also, a direction of a straight line extending through the central axis in a plane perpendicular to the axial direction of the cylindrical shape may be referred to as a radial direction. Also, the cavity 11 may typically be arranged such that the central axis thereof is directed in a substantially horizontal direction, but may also be arranged such that the central axis thereof is directed in a direction other than the horizontal direction.

The cavity main body 11*a* is preferably a component that does not transmit microwaves. The cavity main body 11*a* may be made of a microwave reflective material. The microwave reflective material may be a metal, for example. The metal is not particularly limited, and may be, for example, a stainless steel, a carbon steel, nickel, a nickel alloy, copper, a copper alloy, or the like. As shown in FIGS. 2 and 3, the cavity 11 is supported by supporting rollers 22 so as to be rotatable with respect to a fixed base 7. Note that the cavity 11 may be supported on the base 7 by a mechanism other than the supporting rollers 22 such as, for example, ball bearings, so as to be rotatable. The cavity 11 is rotated about the central axis of the cylindrical shape. Also, in FIG. 1, illustrations of the rotary drive unit 15, the base 7, the supporting rollers 22, and the like are omitted. The expression that the cavity 11 is rotatable may mean that the entirety of the cavity 11 is rotatable, or may mean that at least part of the circumferential surface thereof is rotatable. Note that the present embodiment will mainly describe a case where the entirety of the cavity 11 is rotated, and a case where an end surface plate or part of a circumferential surface is not rotated will be described later. The region of the outer circumference of the cavity main body 11*a* that is not covered with the cover member 13 may be covered with a heat insulation material, a jacket, or the like.

When continuous processing is performed on an object, an entrance and an exit through which the object is passed may be provided at end portions of the cavity 11 in the axial direction. FIGS. 1, 3, and 4 show a case where the end portions of the cavity 11 are closed by end surface plates 11*e* and 11*f*, and an inflow entrance 11*g* for objects is provided in the end surface plate 11*e* located on the upstream side, and an outflow exit 11*h* for objects is provided in the end surface plate 11*f* located on the downstream side. Also, to prevent microwaves inside the cavity 11 from leaking to the outside, the inflow entrance 11*g* and the outflow exit 11*h* may also be provided with a mechanism for preventing leakage of microwaves such as a choke structure. Also, when irradiation with microwaves is performed in batch processing, the end portions of the cavity 11 in the axial direction may be closed. Note that, for example, the end portions may also be openable and closable, in order for an operator to bring an object into and out of the cavity 11.

The microwave transmission portion 11*b* includes one or more microwave transmission areas 11*d*. The microwave transmission areas 11*d* may be provided, for example, over the entire cavity 11 in the circumferential direction or in a partial portion of the cavity in the circumferential direction. The present embodiment will mainly describe a case where a plurality of microwave transmission areas 11*d* are provided over the entire cavity 11 in the circumferential direction.

Note that the number of microwave transmission areas 11*d* may be, for example, one or a plural number. Preferably, the microwave transmission areas 11*d* are provided on a member that has a cylindrical shape and does not transmit microwaves. This member having a cylindrical shape may be made of a microwave reflective material. Examples of the microwave reflective material are as described above. Typically, a plurality of microwave transmission areas 11*d* are provided on a surface of the microwave transmission portion 11*b* in an evenly-distributed manner, but another configuration is also possible. As shown in FIG. 5A, the shape of the microwave transmission areas 11*d* may be, for example, a slit shape, a round shape, a square shape, a rectangular shape, a polygonal shape, or the like, or may be another shape. Also, for example, by selecting the number, the shape, and the layout positions of the microwave transmission areas 11*d*, it is possible to control the degree of introduction of microwaves into the cavity 11, or the like. When the microwave transmission areas 11*d* have a slit shape, the slit-shaped transmission areas 11*d* may extend in the circumferential direction of the cylindrical shape as shown in, e.g., FIG. 5A, in the axial direction of the cylindrical shape, or in another direction. FIG. 5A shows a case where the slit-shaped transmission areas 11*d* are provided at two portions in the axial direction, that is, the slit-shaped transmission areas 11*d* are provided in two lines, but the slit-shaped transmission areas 11*d* may also be provided in only one line, or in three or more lines. Also, FIGS. 5A and 5B show a case where four slit-shaped transmission areas 11*d* are provided in each line at every 90 degrees in the circumferential direction, but a configuration is also possible in which N slit-shaped transmission areas 11*d* are provided in each line at every (360/N) degrees in the circumferential direction. Here, N is an integer number of 2 or more. Also, the plurality of microwave transmission areas 11*d* may be provided in such a manner as not to be lined up in lines. As shown in FIGS. 5A and 5B, as a result of the microwave transmission areas 11*d* being provided over the entire cavity 11 in the circumferential direction, it is possible to introduce microwaves into the cavity 11 in various circumferential directions from the circumferential surface of the cavity 11.

A microwave transmitting window may constitute each of one or more microwave transmission areas 11*d*. In this case, the microwave transmission area 11*d* may be obtained by sealing, with a microwave transmitting material, an opening formed in a cylindrical member that does not transmit microwaves, for example. In this case, it is possible to prevent an object located inside the cavity 11, and water vapor, gasses, or the like generated inside the cavity 11 from moving toward the microwave generator 14 via the microwave transmission areas 11*d*, and prevent failures of the microwave generator 14 or the like.

When the inner surface of the cavity 11 is lined with a microwave transmitting member 51 as will be described later, part of the member 51 may constitute one or more microwave transmission areas 11*d*. In this case, each of the microwave transmission areas 11*d* is constituted by an opening formed in a member that has a cylindrical shape and does not transmit microwaves, and a portion of the member 51 that corresponds to this opening. Also in this case, it is possible to prevent an object or the like located inside the cavity 11 from moving toward the microwave generator 14 via the microwave transmission areas 11*d*, and prevent failures of the microwave generator 14 or the like.

Preferably, there is no gap between the microwave transmission portion 11*b* and the cavity main body 11*a*. The cavity main body 11*a* and the microwave transmission portion 11*b*, which is a member having a cylindrical shape, may be connected to each other by, for example, screw fastening, welding, bonding, or the like, or may be formed as one piece. The present embodiment will mainly describe the latter case, that is to say, a case where a plurality of microwave transmission areas 11*d* are formed in the microwave transmission portion 11*b* of the cavity 11 made of a metal.

Note that, in order to efficiently transmit microwaves into the cavity 11 from a later-described wave guidepath 13*b* via the microwave transmission areas 11*d*, the slit-shaped transmission areas 11*d* preferably extend in the circumferential direction of the cylindrical shape. It is also preferable that the distances, in the circumferential direction and the axial direction, between the slit-shaped transmission areas 11*d* extending in the circumferential direction be set so as to allow microwaves to easily enter the cavity 11. The distances may be, for example, the same distances as those in well-known leakage waveguides, which are square-shaped waveguides provided with, in a surface thereof, a plurality of slit-shaped slots extending in the longitudinal direction.

A microwave transmitting material is a material having a small relative dielectric loss, and may be, without being specifically limited to, a fluoroethylene resin such as polytetrafluoroethylene, quartz, glass, or the like, for example. For example, the relative dielectric loss of the microwave transmitting material is preferably less than 1, more preferably less than 0.1, and further preferably less than 0.01, under the frequency and the temperature of microwaves during operation of the microwave processing apparatus 1. Note that if an object located inside the cavity 11 is heated to a high temperature, quartz or glass is preferably used as the microwave transmitting material.

Note that, as shown in FIGS. 5B to 7, the inner surface of the cavity 11 may be lined with the microwave transmitting member 51. The microwave transmitting member 51 may be a member made of a microwave transmitting material, and may be a heat insulation material that transmits microwaves, for example. In the latter case, the member 51 may be, for example, microwave transmitting firebricks. The member 51 may be provided on both the inner surface of the cavity main body 11*a* and the inner surface of the microwave transmission portion 11*b*. The member 51, if having heat insulating properties, can prevent the wall surfaces of the cavity 11 from being heated to a high temperature. If the microwave processing apparatus 1 is used as a rotary kiln, and the inside of the microwave processing apparatus 1 is heated to a high temperature such as 1000° C. or more, it is preferable that the inner surface of the cavity 11 be lined with the member 51 that is a heat insulation material. By lining the inner surface of the cavity 11 with the member 51 that is a heat insulation material, it is possible to prevent the wall surfaces of the cavity 11 from being heated to a high temperature even when an object located inside the cavity 11 is heated to a high temperature, and enable microwaves to appropriately reach the object via the member 51. On the other hand, if the inside of the cavity 11 is not heated to a high temperature, the member 51 that is a heat insulation material does not need to be provided on the inner surface of the cavity 11. Also, if the above-described microwave transmitting window is used as each of one or more microwave transmission areas 11*d*, the member 51 does not need to be provided on the inner surface of the cavity 11. The microwave transmitting member 51 may be a member that has a relative dielectric loss smaller than those of other members. For example, the relative dielectric loss of the member 51 is preferably less than 1, more preferably less than 0.1, and further preferably less than 0.01, under the frequency and the temperature of microwaves during the operation of the microwave processing apparatus 1.

The length of the cavity 11 in the axial direction may be large. For example, if the microwave processing apparatus 1 is used as a rotary kiln, the length of the cavity 11 in the axial direction may be large such as being 30 meters long or more, or 50 meters or more. Note that, for example, if the microwave processing apparatus 1 is not used as a rotary kiln, the length of the cavity 11 in the axial direction does not need to be so large. For example, the length of the cavity 11 in the axial direction may be 1 meter, 5 meters, 10 meters, or the like.

The cover member 13 is provided on an outer circumferential side of the microwave transmission portion 11*b*, that is, on an outer circumferential side of one or more microwave transmission areas 11*d*, while covering the entire portion of the cavity 11 in the circumferential direction. With the cover member 13, the wave guidepath 13*b* for microwaves introduced from the microwave generator 14 is formed on the outer circumferential side of the cavity 11. Also, the microwaves introduced into the wave guidepath 13*b* enter the internal space 11*c* of the cavity 11 via the one or more microwave transmission areas 11*d*, so that the object is heated. Note that the cover member 13 is not rotatable. That is to say, the cover member 13 is fixed to a side of the base 7, and is movable relative to the rotating cavity 11. As shown in, for example, FIGS. 2 and 3, the cover member 13 may be fixed to a side of the base 7, while being supported by supporting parts 23 fixed to the base 7.

The wave guidepath 13*b* has a hollow cylindrical shape. It is also conceivable that the wave guidepath 13*b* has the same shape as a hollow cylindrical shape that is formed by bending a square waveguide into a round shape. The wave guidepath 13*b* is formed also using components other than the cover member 13. In the present embodiment, as shown in FIGS. 6 and 7, the wave guidepath 13*b* is constituted by the microwave transmission portion 11*b* and the cover member 13. More specifically, the outer circumferential surface of the wave guidepath 13*b* is formed by the cover member 13, the inner circumferential surface of the wave guidepath 13*b* is formed by the outer circumferential surface of the microwave transmission portion 11*b*, and side surfaces (that is, surfaces that connect the outer circumferential surface and the inner circumferential surface) of the wave guidepath 13*b* are formed by the cover member 13. Note that it is preferable that the length of the wave guidepath 13*b* in the axial direction and the length of the microwave transmission portion 11*b* in the axial direction be equal to each other, and the position of the wave guidepath 13*b* in the axial direction and the position of the microwave transmission portion 11*b* in the axial direction also correspond to each other.

The wave guidepath 13*b* has an opening 13*c* for introducing microwaves generated by the microwave generator 14. The waveguide 14*a* is connected to the opening 13*c*. Also, by the waveguide 14*a*, the microwaves from the microwave generator 14 are guided to the wave guidepath 13*b*. As shown in FIG. 6, preferably, the waveguide 14*a* is provided while extending in a tangential direction of the wave guidepath 13*b* having a hollow cylindrical shape. Note that the microwave generator 14 may also be directly connected to the opening 13*c*. Also, the opening 13*c* may be sealed by a microwave transmitting material. Examples of the microwave transmitting material are as described above.

The cross section taken along a plane perpendicular to the circumferential direction of the wave guidepath 13*b* preferably has the same size as the cross section of a square waveguide suitable for the frequency of microwaves that propagate in the wave guidepath 13*b*. For example, if microwaves of 2.45 GHz propagate in the wave guidepath 13*b*, the length of the wave guidepath 13*b* in the axial direction may be 109.2 (mm), and the length of the wave guidepath 13*b* in the radial direction may be 54.6 (mm).

Microwaves from two or more microwave generators 14 may also be introduced into the wave guidepath 13*b*. The wave guidepath 13*b* has a dimension that corresponds to the frequency of microwaves to be introduced, and thus even if microwaves from two or more microwave generators 14 are introduced into the wave guidepath 13*b*, the microwaves generated by the two or more microwave generators 14 will typically have the same frequency.

Preferably, the cover member 13 is a member that does not transmit microwaves. The cover member 13 may be made of a microwave reflective material. The microwave reflective material may be a metal, for example. Examples of the metal are as described above.

Note that the present embodiment shows a case where the outer shape of the cover member 13 is a cylindrical shape, but the cover member 13 does not need to have such a shape. The outer shape of the cover member 13 may also be a cuboid shape or the like. Even in this case, the inner circumferential surface of the cover member has a cylindrical shape since it constitutes the wave guidepath 13*b*.

As shown in FIG. 7, the cover member 13 may be provided on the outer circumferential side of the cavity 11 by using the ball bearings 41, so as to be rotatable. Note that gaps formed between the outer circumferential surface of the cavity 11 and portions of the cover member 13 other than the wave guidepath 13*b* preferably have a constant length in the radial direction. The ball bearings 41 may be provided at positions different from the positions shown in FIG. 7, and a larger number of ball bearings may also be provided. Note that the ball bearings 41 may also be provided at positions at which entrance of microwaves is blocked by a later-described leakage prevention mechanism, so that the ball bearings 41 are prevented from being irradiated with microwaves. In FIG. 1, for ease of description, illustration of the ball bearings 41 is omitted.

Also, the leakage prevention mechanisms for preventing microwaves propagating in the wave guidepath 13*b* from leaking outward from the gaps between the cavity 11 and the cover member 13 may be provided between the cavity 11 and the cover member 13. The microwave leakage prevention mechanisms may be choke structures 31 shown in FIG. 7. Note that the choke structures are already well-known, and thus a detailed description thereof is omitted. In the present embodiment, a case is described where the cover member 13 includes the choke structures 31, but such choke structures may also be provided on the cavity 11 side, for example.

Also, the cavity 11, the inner circumferential surface of the wave guidepath 13*b* of the cover member 13, and the inner circumferential surface of the portion of the cover member 13 other than the wave guidepath 13*b* are preferably concentric.

The microwave generator 14 generates microwaves. The microwave generator 14 may use, for example, magnetron, klystron, gyrotron, or the like to generate microwaves, or may use a semiconductor element to generate microwaves. Microwaves may have a frequency of, for example, 915 MHz, 2.45 GHz, 5.8 GHz, or 24 GHz, or may have another frequency in a range from 300 MHz to 300 GHz. Also, the intensity of microwaves may be controlled as appropriate by a not-shown control unit. The control may be feedback control that uses sensing results such as, for example, the temperature in the cavity 11, the temperature of an object, and the amount of moisture of the object.

The rotary drive unit 15 rotates the cavity 11 about the axis of the cylindrical shape. The rotary drive unit 15 may be, for example, a motor or the like. As shown in, for example, FIGS. 2 and 3, the rotary drive unit 15 may be fixed to the base 7. Also, a chain 21 is wound around a chain wheel 15*a* that is rotated by the rotary drive unit 15 and a chain wheel 15*b* that is provided so as to be concentric with the cavity 11, and as a result of the chain wheel 15*a* being rotated by the rotary drive unit 15, the cavity 11 is rotated. The rotation may be directed in the same direction as microwaves propagating in the wave guidepath 13*b*, or may be directed in an inverted direction. In the former case, the cavity 11 is rotated clockwise in FIG. 6, and in the latter case, the cavity 11 is rotated counterclockwise in FIG. 6. Also, the rotary drive unit 15 may swing the cavity 11. Note that the swing is preferably performed in a range of angles at which an object is irradiated uniformly with microwaves. Note that it will be appreciated that a mechanism other than the above-described mechanisms may be used as the rotation mechanism for rotating the cavity 11. For example, the cavity 11 may be rotated via a gear or the like. The rotary drive unit 15 may or may not rotate the cavity 11 at a constant rotation speed.

Note that the present embodiment has described a case where irradiation with microwaves is performed at one position of the cavity 11 in the axial direction, but irradiation with microwaves may also be performed at two or more positions of the cavity 11 in the axial direction. In this case, microwave transmission portions 11*b* may be provided at two or more positions of the cavity 11 in the axial direction, and wave guidepaths 13*b* for microwaves may be formed at the two or more positions. Note that, for example, one cover member 13 and one rotary drive unit 15 may be provided for each wave guidepath 13*b* for microwaves, or may be provided for a plurality of wave guidepaths 13*b* for microwaves. In the latter case, the cover member 13 forms a plurality of wave guidepaths 13*b*. Also, when irradiation with microwaves is performed at two or more positions of the cavity 11 in the axial direction, the microwave processing apparatus 1 may include one microwave generator 14, or may include a plurality of microwave generators 14. In the former case, microwaves generated by one microwave generator 14 may be branched and emitted. Also, when a plurality of microwave generators 14 are used, microwaves generated by the microwave generators 14 may have the same frequency, or may have different frequencies.

Also, the present embodiment has described a case where microwaves generated by the microwave generator 14 are introduced into the wave guidepath 13*b* by the waveguide 14*a*, but microwaves generated by the microwave generator 14 may be introduced into the wave guidepath 13*b* by another transmission means such as a coaxial cable. When microwaves are transmitted by a coaxial cable, an antenna for radiating microwaves that is connected to the coaxial cable may be provided in the wave guidepath 13*b*.

The following will briefly describe a method for irradiating an object with microwaves using the microwave processing apparatus 1 of the present embodiment. An object is put into the internal space 11*c* of the cavity 11, microwaves are generated by the microwave generator 14, and the cavity 11 is rotated by the rotary drive unit 15. As a result, the microwaves guided from the microwave generator 14 to the wave guidepath 13*b* are emitted to the object via one or more microwave transmission areas 11*d* formed in the rotating microwave transmission portion 11*b*. Here, since the microwave transmission portion 11*b* is rotated, the microwaves are emitted to the object from various positions in the circumferential direction. As a result, uniform irradiation of the object with the microwaves can be realized. Note that in the case of batch processing, each time processing on an object is complete, the object is replaced. On the other hand, in the case of continuous processing, charging an object to be processed into the cavity 11 from the inflow entrance 11*g*, and discharging the processed object from the outflow exit 11*h* are performed continuously.

As described above, according to the microwave processing apparatus 1 of the present embodiment, it is possible to introduce microwaves into the cavity 11 from the circumferential surface thereof. Accordingly, even if the length of the cavity 11 in the axial direction is large, an object located inside the cavity 11 can be irradiated with the microwaves at a position at which microwave irradiation is desired. Also, if, for example, microwave transmission portions 11*b* and wave guidepaths 13*b* are provided at a plurality of positions of the cavity 11 in the axial direction, it will be possible to suppress a reduction in temperature of the object located inside the cavity 11, even if the length of the cavity 11 in the axial direction is large, compared to a case where microwaves are introduced only from an end of the cavity 11, making it possible to appropriately heat the object. Also, if the microwave transmission portion 11*b* has a configuration in which a plurality of microwave transmission areas 11*d* are provided over the entire portion, in the circumferential direction, of a member that is microwave reflective and has a cylindrical shape, microwaves will be introduced into the cavity 11 while the plurality of transmission areas 11*d* are being rotated, and thus an object located inside the cavity 11 can be irradiated with the microwaves more uniformly in various circumferential directions, making it possible to realize more uniform heating.

Note that the present embodiment has mainly described a case where a plurality of microwave transmission areas 11*d* are provided in the microwave transmission portion 11*b*, but another configuration is also possible. The microwave transmission portion 11*b* itself may serve as a single microwave transmission area 11*d*. In this case, the microwave transmission portion 11*b* may be, for example, a portion that is made of a microwave transmitting material and has a cylindrical shape, or the region of the transmission portion 11*b* may also include the above-described member 51.

The following will describe modifications of the microwave processing apparatus according to the present embodiment.

[End Surface Plate of Fixed Cavity]

Figure 8:
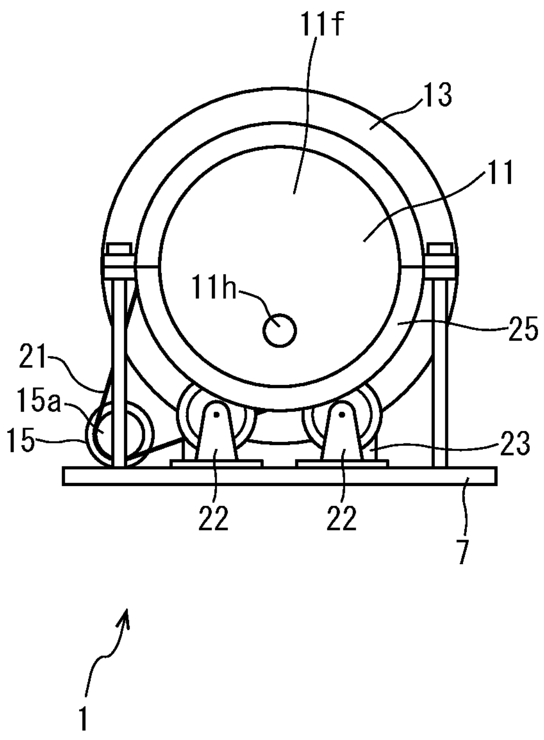
FIG. 8 is a side view illustrating another example of the microwave processing apparatus according to the embodiment.

A case has been described in which the end surface plates 11*e* and 11*f* of the cavity 11 are rotated together with the side surface of the cavity 11, but it may not be essential. At least one of the end surface plates 11*e* and 11*f* of the cavity 11 may be fixed to a side of the base 7. FIG. 8 is a side view showing a state in which the end surface plate 11*f* is fixed to the base 7. FIG. 8 shows a state in which the end surface plate 11*f* is supported by a supporting part 25 fixed to the base 7. In this case, it is preferable that a microwave leakage prevention mechanism such as a choke structure be provided between the cavity main body 11*a* and the end surface plate 11*f*, so that no microwave leaks from a gap therebetween. It is also preferable that a microwave irradiation object be prevented from leaking from this gap. In this case, as shown in FIG. 8, the outflow exit 11*h* can be provided at a suitable position. Note that a configuration in which the end surface plate is fixed, and only the circumferential surface of the cavity is rotated is disclosed in Patent Document 1 above, and detailed descriptions thereof are omitted.

[Introduction of Microwaves from End Surface of Cavity]

A case has been described in which microwaves are introduced into the cavity 11 from the circumferential surface of the cavity 11, but a configuration may also be employed in which microwaves are introduced also from the end surfaces of the cavity 11. In this case, the end surface plates are preferably not rotated together with the circumferential surface.

[Configuration without Cover Member]

Figure 9:
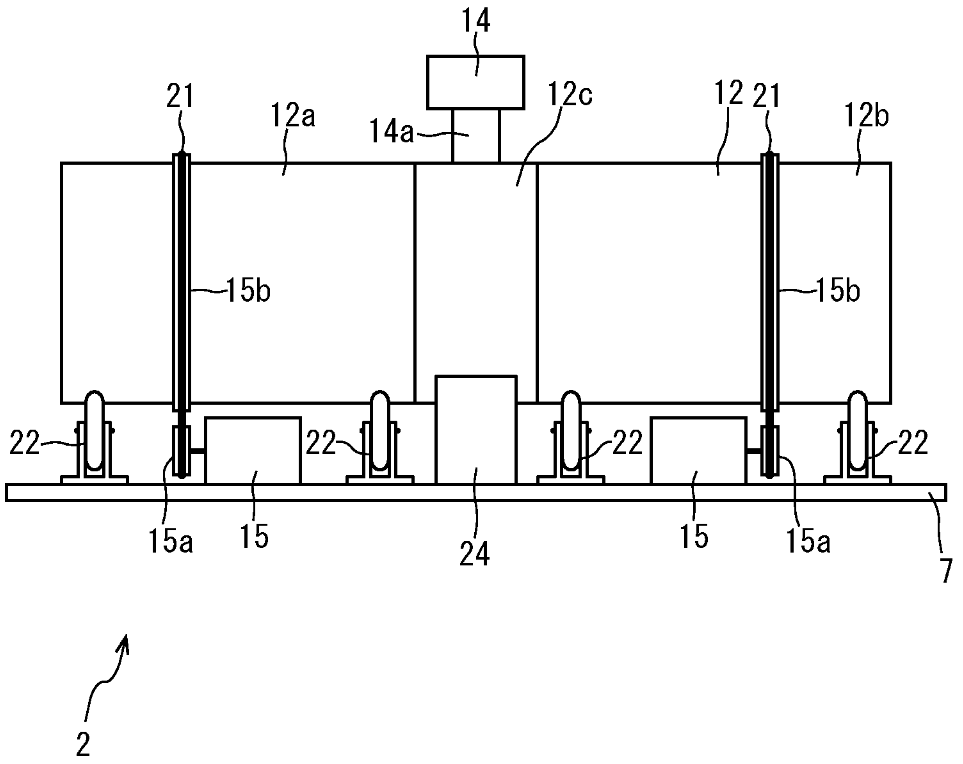
FIG. 9 is a front view illustrating yet another example of the microwave processing apparatus according to the embodiment.

The present embodiment has described a case where microwaves introduced into the wave guidepath 13*b* formed by the cover member 13 are introduced into the cavity 11 via one or more microwave transmission areas 11*d* formed in the microwave transmission portion 11*b*, but it may not be essential. FIG. 9 is a front view showing a configuration of a microwave processing apparatus 2 in which microwaves are introduced into a cavity 12 without passing through any wave guidepath 13*b*. The microwave processing apparatus 2 shown in FIG. 9 includes the cavity 12, the microwave generator 14, and the rotary drive unit 15. The cavity 12 includes, in a partial portion in the axial direction thereof, a fixed part 12*c* that is fixed to a side of the base 7. As shown in FIG. 9, the fixed part 12*c* may be fixed to the base 7 by a supporting part 24. Note that rotation parts 12*a* and 12*b* other than the fixed part 12*c* are rotated similar to the cavity 11. The configuration of the microwave processing apparatus 2 is the same as that of the microwave processing apparatus 1 except for the fixed part 12*c* of the cavity 12 being not rotatable, and thus a detailed description thereof is omitted.

The fixed part 12*c* is a cylindrical member that is not rotatable, and is preferably made of a material that does not transmit microwaves. The fixed part 12*c* may be made of a microwave reflective material. Examples of the microwave reflective material are as described above. Also, the inside of the fixed part 12*c* is in communication with the waveguide 14*a*, and a configuration is such that microwaves generated by the microwave generator 14 are introduced into the internal space of the cavity 11 in the fixed part 12*c* via the waveguide 14*a*. Note that, since the fixed part 12*c* is not rotatable, it is preferable that the length of the fixed part 12*c* in the axial direction be rather small. Also, microwaves from the microwave generator 14 may be introduced into the cavity 12 without passing through the waveguide 14*a*. Also, a space between the microwave generator 14 and the inside of the cavity 12 may be sealed by, for example, a microwave transmitting material. With such a simple configuration, it is also possible to introduce microwaves into the inside of the cavity 11 from the circumferential surface thereof.

In this case, it is preferable that microwave leakage prevention mechanisms such as choke structures be provided between the fixed part 12*c*, and the rotation parts 12*a* and 12*b*, so that no microwave leaks from the gap therebetween. It is also preferable that a microwave irradiation object be prevented from leaking from this gap. Also, the fixed part 12*c* may also be connected to the rotation parts 12*a* and 12*b* by, for example, ball bearings or the like, so that the rotation parts 12*a* and 12*b* are rotatable.

Also, if the inner surface of the cavity 12 is lined with lining members (that correspond to the member 51, for example) that transmit microwaves, a configuration is also possible in which, for example, the lining member provided on the inner surface of the fixed part 12*c* is provided as one piece with the lining member provided on the inner surface of the rotation parts 12*a* and 12*b* that are rotatable, and the lining members provided on the inner surface of the cavity 12 are rotatable as one piece over the entire cavity 12 in the axial direction. In this case, it is preferable that, in a region of the fixed part 12*c*, a gap be provided between the inner circumferential surface of the cylindrical member of the fixed part 12*c* and the outer circumferential surface of the lining member. Also, the lining members of the inner surface of the cavity 12 are typically rotated together with the rotation parts 12*a* and 12*b*. Accordingly, it is preferable that the rotation parts 12*a* and 12*b* be rotated in a coordinated manner in the same direction and at the same rotation speed.

Note that, for example, if the inner surfaces of the rotation parts 12*a* and 12*b*, and the inner surface of the fixed part 12*c* are lined with different lining members, or if the inner surface of the cavity 12 is not lined with any lining member, an object will not be stirred inside the fixed part 12*c*. Accordingly, a stirring means may also be provided in an inner space of the cavity 12. This stirring means may stir an object only in a region of the fixed part 12*c*, or may stir an object over the entirety of the cavity 12 in the axial direction.

Also, for example, if the inner surfaces of the rotation parts 12*a* and 12*b*, and the inner surface of the fixed part 12*c* are lined with different lining members, or if the inner surface of the cavity 12 is not lined with any lining member, the rotation part 12*a* and the rotation part 12*b* may be rotated in a coordinated manner, or may be rotated independently. In the former case, the two rotation parts are rotated in the same direction and at the same rotation speed, and in the latter case, the two rotation parts may also be rotated in opposite directions, or rotated at different rotation speed, for example.

Figure 10:
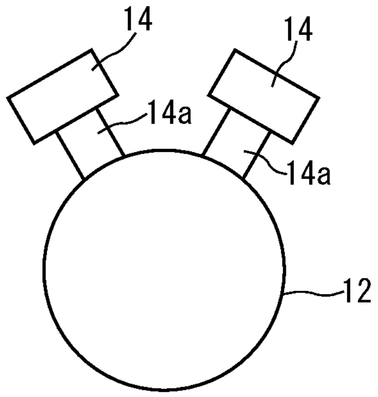
FIG. 10 is a diagram illustrating an example in which the cavity and a plurality of microwave generators according to the embodiment are provided.

Also, in this case, microwaves can also be introduced at a plurality of positions in the fixed part 12*c*. In this case, as shown in, for example, FIG. 10, microwaves from two or more microwave generators 14 may also be introduced into the cavity 12, or microwaves from one microwave generator 14 may be branched and the branched microwaves may be introduced into the cavity 12. In the former case, frequencies of the microwaves generated by the two or more microwave generators 14 may be the same or different from each other. Alternatively, the positions in the circumferential direction of the cavity 12 at which microwaves are introduced, and the angles of irradiation with microwaves are not limited. For example, in FIG. 10, microwaves are introduced from two positions at the angle of 60 degrees, but a configuration is also possible in which, for example, microwaves are introduced into the cavity 12 from two positions at the angle of 90 degrees, 120 degrees, 180 degrees, or the like. Note that in FIG. 10, illustrations of the rotary drive unit 15, the supporting roller 22, and the like are omitted.

A configuration is also possible in which fixed parts 12*c* are provided at two or more positions of the cavity 12 in the axial direction, and microwaves are introduced into the cavity 12 at the positions of the fixed parts 12*c*. Also, in this case, for example, microwaves from two or more microwave generators 14 may be introduced into the cavity 12 from the plurality of fixed parts 12*c*, or microwaves from one microwave generator 14 may be branched and the branched microwaves may be introduced into the cavity 12 from the plurality of fixed parts 12*c*. In the former case, the frequencies of the microwaves generated by the plurality of microwave generators 14 may be the same or different from each other.

Note that if a microwave generator 14 is allowed to be rotated together with the cavity, the microwave generator 14 may be fixed to the outer side of the cavity supported so as to be rotatable, and the entire cavity may be rotated. Also, microwaves from the microwave generator 14 may be introduced into the cavity from the circumferential surface thereof. In this case, since the entire cavity can be rotated, and there is no need of providing a wave guidepath 13*b*, it is possible to simplify the configuration of the microwave processing apparatus. The microwave generator 14 may also be fixed to the circumferential surface of the cavity 12, for example. Note that power supply of the microwave generator 14 may be performed via a wire that is provided on, for example, the outer circumferential side of the cavity and extends in the circumferential direction, may be performed by contactless power transmission, or may be performed by using a battery fixed to the cavity.

Also, the above-described embodiment has been described on the assumption that the cavity 11, 12 is cylindrical, that is to say, the cross section of the cavity 11, 12 that is perpendicular to the axial direction thereof has the shape of a precise circle, but the cavity 11, 12 may have a cross section having a shape slightly deviated from a precise circle, for example, an ellipsoidal shape or a regular polygonal shape. In any case including a case where the cross section perpendicular to the axial direction has the shape of a precise circle, and a case where the cross section has a shape slightly deviated from a precise circle, the shape of the cavity 11, 12 may be sometimes referred to as a "cylinder-like shape". When the cross section of the cavity 11 that is perpendicular to the axial direction thereof has a shape slightly deviated from a precise circle, the cover member 13 preferably has a configuration in which the cavity 11 is rotatable in the inner circumferential side of the cover member 13.

Also, the microwave processing apparatus 1 can be realized by, for example, mounting the cover member 13 and the microwave generator 14 on an existing cavity 11 such as a rotary kiln. Accordingly, in this case, a microwave introduction apparatus that includes the cover member 13 and the microwave generator 14 may be mounted to a rotatable cavity 11 that includes, in a partial region thereof in the axial direction, a microwave transmission portion. This microwave introduction apparatus includes; for example, the cover member 13 that is provided on the outer circumferential side of one or more microwave transmission areas 11*d* formed in a partial region of the cylindrical cavity 11 in the axial direction, while covering the cavity 11 over the entire portion of the cavity 11 in the circumferential direction, the cavity 11 being supported on the fixed base 7 so as to be rotatable, and includes an internal space for accommodating a microwave irradiation object, the cover member 13 forming the wave guidepath 13*b* for microwaves on the outer circumferential side of the cavity 11; and the microwave generator 14 that generates microwaves to be introduced into the wave guidepath 13*b*.

It will be appreciated that the present invention is not limited to the above-described embodiments, and various modifications are possible which are intended to be encompassed within the scope of the present invention.

As described above, the microwave processing apparatus, the microwave processing method, and the microwave introduction apparatus according to the aspects of the present invention can achieve effects of enabling a microwave irradiation object to be appropriately irradiated with microwaves at a position at which microwave irradiation is desired, even if its cavity having a cylinder-like shape has a large length in the axial direction, for example. The present invention is useful for a microwave processing apparatus or the like that irradiates an object with microwaves.

The invention claimed is:

1. A microwave processing apparatus comprising:

a cavity comprising a cylinder-like shape, is rotatably supported on a fixed base, and includes an internal space for accommodating a microwave irradiation object; and a microwave generator configured to generate microwaves, wherein the cavity is rotated about an axis of the cylinder-like shape, the cavity includes at least one microwave transmission area in a partial region of the cavity in an axial direction, the microwaves generated by the microwave generator are introduced into the internal space from a circumferential surface of the cavity through the at least one microwave transmission area, the cavity is lined with a microwave transmitting member, and part of the microwave transmitting member constitutes the at least one microwave transmission area.

2. The microwave processing apparatus according to claim 1, further comprising a cover member that is provided on an outer circumferential side of the at least one microwave transmission area while covering the entire portion of the cavity in a circumferential direction, the cover member forming a wave guidepath for the microwaves introduced from the microwave generator on an outer circumferential side of the cavity.

3. The microwave processing apparatus according to claim 2, wherein the cover member is fixed to a side of the base so as to be movable relative to the cavity.

4. A microwave processing method comprising the steps of:

rotating a cavity that has a cylinder-like shape, is rotatably supported on a fixed base, and includes an internal space for accommodating a microwave irradiation object, about an axis of the cylinder-like shape, the cavity including at least one microwave transmission area in a partial region of the cavity in an axial direction; and introducing microwaves into the internal space from a circumferential surface of the cavity through the at least one microwave transmission area, wherein the cavity is lined with a microwave transmitting member, and part of the microwave transmitting member constitutes the at least one microwave transmission area.

* * * * *